April 13, 1965     C. B. WESSLUND     3,177,866
DEVICE FOR STIMULATING PERIPHERAL VASCULAR CIRCULATION
Filed April 24, 1962     4 Sheets-Sheet 1

INVENTOR.
CHARLES B. WESSLUND
BY
ATTORNEY

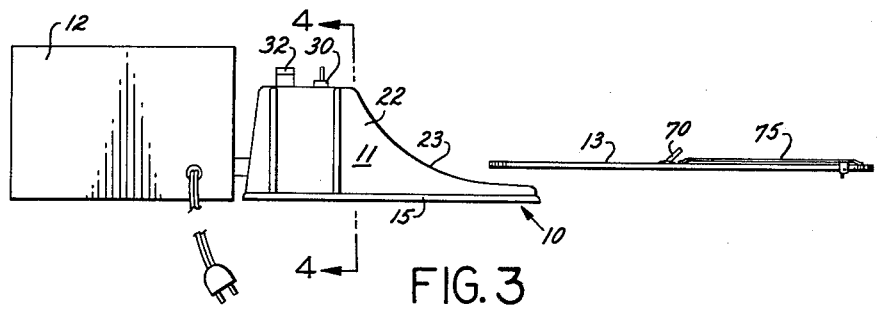
FIG. 3
FIG. 4
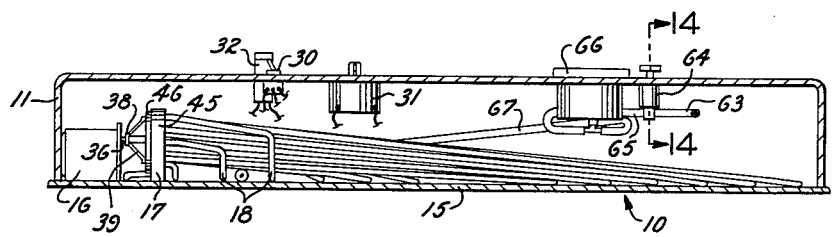
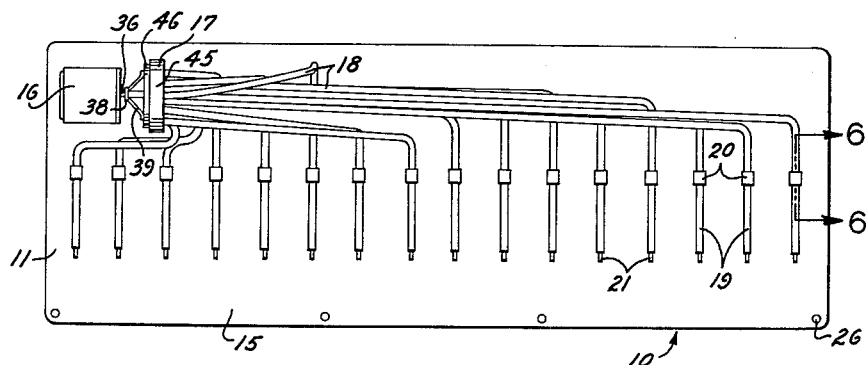
FIG. 5
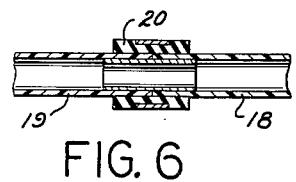
FIG. 6

INVENTOR.
CHARLES B. WESSLUND
BY R.E. Geangue
ATTORNEY

April 13, 1965     C. B. WESSLUND     3,177,866
DEVICE FOR STIMULATING PERIPHERAL VASCULAR CIRCULATION
Filed April 24, 1962                                4 Sheets-Sheet 4

INVENTOR.
CHARLES B. WESSLUND
BY R.E. Geauque
ATTORNEY

United States Patent Office 3,177,866
Patented Apr. 13, 1965

3,177,866
DEVICE FOR STIMULATING PERIPHERAL
VASCULAR CIRCULATION
Charles B. Wesslund, Van Nuys, Calif., assignor to R & W
Medical Equipment, Inc., North Hollywood, Calif., a
corporation of Nevada
Filed Apr. 24, 1962, Ser. No. 189,780
2 Claims. (Cl. 128—24)

This invention relates to a device for, and a method of, stimulating peripheral vascular circulation in a proximal direction and more particularly to a device for, and a method of, applying a mild, peripheral pressure to the limbs of the human body incrementally and cyclically in a proximal direction.

Peripheral circulation in the outer extremities of the body is quite often hampered due to various peripheral vascular diseases and venous incompetencies. It has been found that this circulation may be improved by proper massaging in accordance with the present invention.

It is an object of the present invention to provide a device for, and a method of, stimulating peripheral vascular circulation in a proximal direction.

It is a further object of the invention to provide a device for, and a method of, applying a mild, peripheral pressure to the limbs of humans in a proximal direction by increments in accordance with a predetermined sequence.

Another object of the invention is to provide a device having a plurality of inflatable bands which may be fastened about the limb of a patient and inflated with a mild air pressure in accordance with a predetermined pattern.

Yet another object of the invention is to provide a device of the type described employing a novel air distributor for distributing air to inflatable bands of the invention in accordance with a predetermined cycle.

A still further object of the invention is to provide a device of the type described employing inflatable bands having an air inlet member disposed at the mid-point of the band and having means to prevent the band from engaging the limb of a patient too tightly.

These and more specific objects will be fully understood by reference to the specification and drawings herein.

In the drawings:

FIGURE 3 is an end elevational view taken along line 3—3 of FIGURE 2;

FIGURE 4 is a cross-sectional view taken along line 4—4 of FIGURE 3;

FIGURE 5 is a plan view of the device of the invention with its cover removed;

FIGURE 6 is a cross-sectional view of a detail taken along line 6—6 of FIGURE 5;

Figure 1:
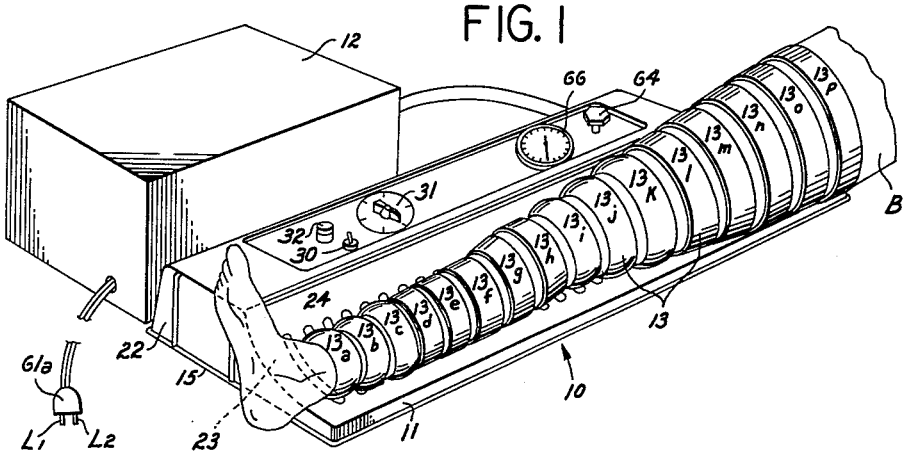
FIGURE 1 is a perspective view of a device of the invention showing the leg of a patient in operative engagement therewith.
Figure 2:
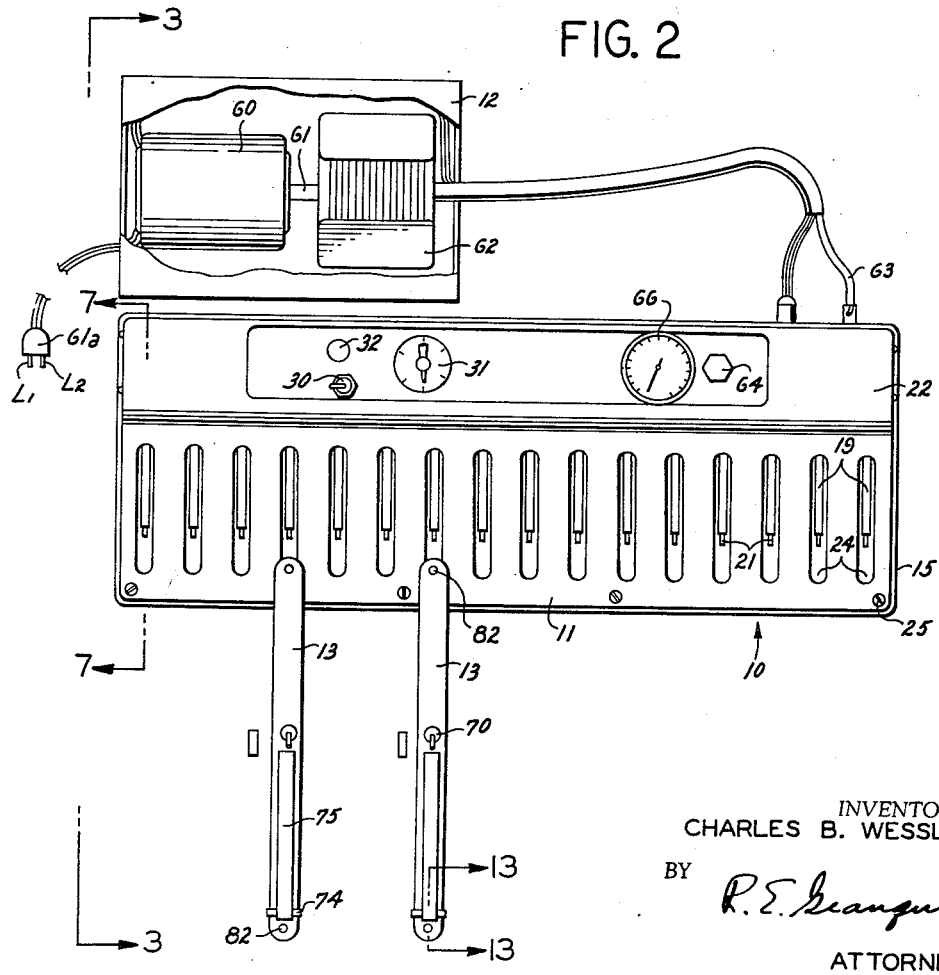
FIGURE 2 is a plan view of the device of FIGURE 1 with the leg of the patient and most of the inflatable bands removed.
Figure 7:
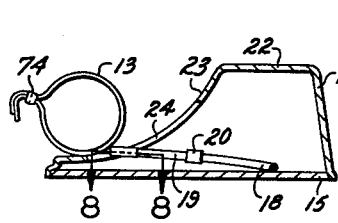
FIGURE 7 is a cross-sectional view taken along line 7—7 of FIGURE 2.
Figure 8:
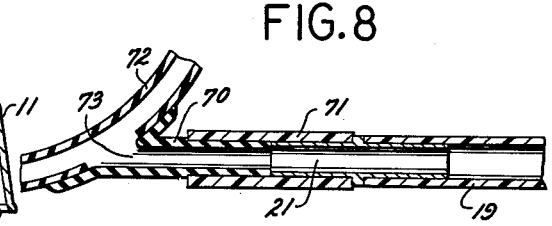
FIGURE 8 is a cross-sectional view, on an enlarged scale, taken along line 8—8 of FIGURE 7.
Figure 9:
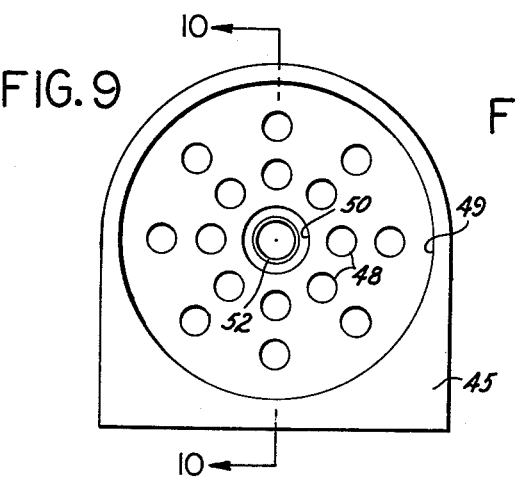
FIGURE 9 is a side elevational view of the body portion of an air distributor used with a device of the invention.
Figure 10:
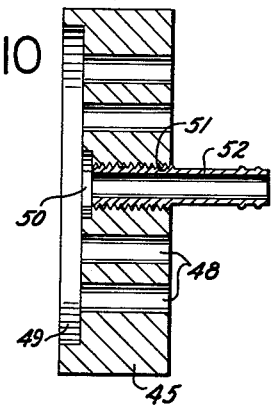
FIGURE 10 is a cross-sectional view taken along line 10—10 of FIGURE 9.
Figure 11:
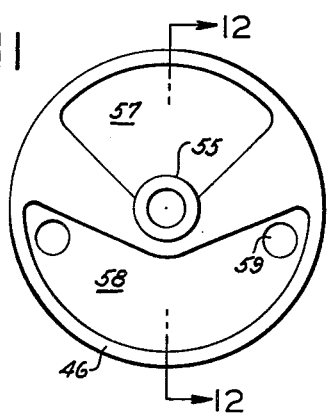
FIGURE 11 is a side elevational view of the rotor portion of the air distributor.

Referring again to the drawings and more particularly to FIGURES 1–5, the device of the invention, indicated generally by the numeral 10, includes an air transmitting member 11, an electrically driven air compressor 12, and a plurality of inflatable bands 13. The limb B of a patient may be supported on the air transmitting member 11 and the bands 13 may be fastened about the limb B. Air is supplied from the air compressor 12 to the air transmitting member 11 which inflates the bands 13 sequentially in accordance with a predetermined operating cycle.

The air transmitting member 11 comprises a base plate 15 upon which is mounted an electric motor 16, an air distributor 17 and a plurality of air distribution conduits 18. A plurality of flexible tubes 19 are connected to the discharge ends of conduits 18 by means of connectors 20 (FIGURES 5 and 6) and a nipple 21 is affixed in the discharge end of each tube 19. A cover 22 is employed to cover the elements just described and includes a longitudinal, arcuate recess 23 shaped to accommodate the leg or arm of a patient. While any suitable material may be employed for the cover 22, it is preferred to use a synthetic material of a type which is rigid, but which does not become uncomfortable to the touch when cold. One such material is sold by the United States Rubber Co. under the trademark "Royalite." The cover 22 may be constructed by bonding several layers of Royalite together with heat and contains a plurality of slotted openings 24 which are located superjacent the tubes 19 so that access to the nipples 21 may be had therethrough. The cover 22 may be secured to the base plate 15 by means of screws 25 which threadedly engage apertures 26 in the base plate 15.

Figure 16:
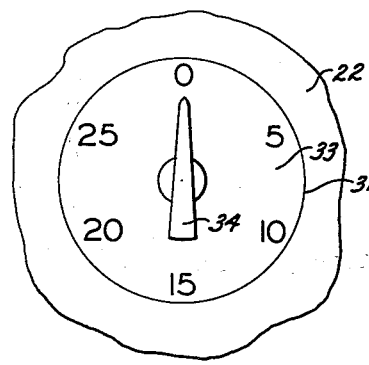
FIGURE 16 is a plan view of a timing mechanism used with the device of the invention.

The electric motor 16 is a single-phase, capacitor start, low-torque motor designed to run at 14 r.p.m. and is controlled through a toggle switch 30, a timer 31 and a fuse 32, each of which may be mounted on the cover 22. The toggle switch 30 is wired in an electrical circuit with the motor 16 in such a manner that current is directed to the motor 16 in one direction when the switch is moved to a first position and will direct current to the motor 16 in the opposite direction when the switch 30 is moved to a second position. The timer 31 has a scale 33 (FIGURE 16) which is divided into six 5-minute increments and is wired in an electrical circuit with the motor 16 so that the timer 31 will disconnect the motor 16 upon the expiration of a predetermined time interval set into the timer 31 by means of its control knob 34.

Figure 12:
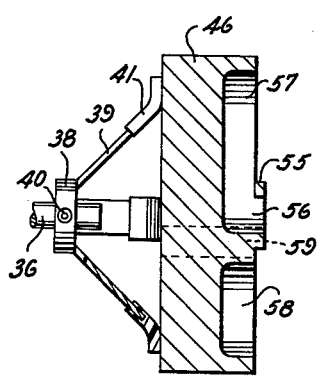
FIGURE 12 is a cross-sectional view taken along line 12—12 of FIGURE 11.
Figure 13:
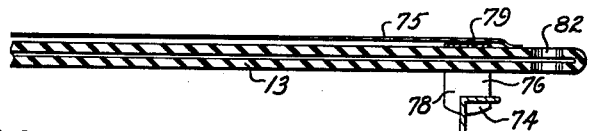
FIGURE 13 is a cross-sectional view, on an enlarged scale, taken along line 13—13 of FIGURE 2.

Referring now to FIGURES 4, 5, and 12, the motor 16 includes an output shaft 36 which drives the air distributor 17 at 14 r.p.m. through a hub 38 and a plurality of flexible fingers 39. The hub 38 is keyed to the shaft 36 by means of a set screw 40 and has the flexible fingers 39 rigidly affixed thereto. The fingers 39 frictionally engage the distributor 17 through resilient pads 41.

Referring now to FIGURES 4, 5, and 9–12, the air distributor 17 comprises a housing 45 and a rotor 46. The housing 45 includes a plurality of air outlet ports 48, first and second annular recesses 49 and 50, and an internally threaded bore 51. An externally-threaded air-inlet nipple 52 threadedly engages the bore 51 and seats in the second annular recess 50. The rotor 46 is adapted to be rotatably mounted with close tolerance in the first recess 49 in the housing 45 and includes a hub 55, an air inlet port 56, a first air-receiving chamber 57, and a second air-receiving chamber 58. A plurality of vents 59 vent the chamber 58 to atmosphere. The rotor 46 is frictionally driven by the motor 16 through the flexible fingers 39 and resilient pads 41 which are also adapted to maintain the rotor 46 in position in the first recess 49 of housing 45.

The electrically driven air compressor 12 (FIGURE 2) includes an electric motor 60 having a shaft 61 drivingly connected to an air compressor 62 and may be connected to a source of power by means of an electrical plug 61a. The motor 60 is wired into the same circuit as the motor 16 and the timer 31 so that the motor 60 may also be controlled by the timer 31. Air from the air compressor 62 is supplied to the air distributor 17 through a first conduit 63, a pressure regulator 64, a second conduit 65, a pressure gauge 66, a third conduit 67 and the air-inlet nipple 52. The air passes through the nipple 52 and the air inlet port 56 into the air receiving chamber 57 in rotor 46. Rotation of the rotor 46 distributes the air in chamber 57 to the air outlet ports 48 in housing 45. The air distribution conduits 18 may be connected to the outlet ports 48 to receive air therefrom and transmit it to the inflatable bands 13 which may be connected to the conduits 18, as will be described more fully hereinafter.

Figure 17:
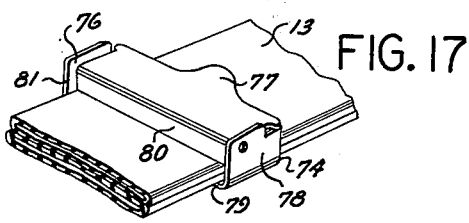
FIGURE 17 is an enlarged perspective view showing a detail of construction of one of the inflatable bands of the invention.

Referring now to FIGURES 1–2, 7–8, 13 and 17, the inflatable bands 13 are adapted to lie flat when deflated (FIGURE 2) and each band 13 includes an air inlet nipple 70 which is located at the center of band 13 to facilitate air distribution about the band 13 when it is in position on the limb B. The nipple 70 lies at an angle to the band 13 (FIGURE 8) so that the band 13 will be tangent to the recess 23 (FIGURE 7) when the band 13 is in position on the limb B and the nipple 70 is connected to the nipple 21 of tube 19 by means of a connector 71. Each band 13 also includes an encompassing sidewall 72 having a port 73 which communicates with the nipple 70. Each band 13 is fastened about the limb B by means of a clamp 74 which is slidably mounted on the band 13 subjacent a retaining strap 75 having one end affixed to the band 13 near its mid-portion and its other end affixed to the band 13 near one of its ends. The strap 75 maintains the clamp 74 in position at one end of the band 13 in such a manner that the clamp is always available to receive the other end of band 13 and clamp it in position about the limb B. The clamp 74 includes a U-shaped bracket 76 and an L-shaped toggle 77. The bracket 76 has upstanding legs 78 and a flat bite portion 79. The toggle 77 is pivotally mounted between legs 78 in a position such that the depending lip 80 of the toggle 77 will be recessed back from the leading edges 81 of the legs 78, as best seen in FIGURE 17. This is an important feature of the invention because it prevents the band 13 from being overtightened about the limb B and permits the toggle 77 to release its grip on band 13 should the band 13 be overinflated. Each end of the band 13 has an aperture 82 ventingt he end of the band to atmosphere so that air leaking past the clamp 74 will not inflate the ends of the band 13 beyond the clamp 74.

FIGURE 1 shows, for purpose of illustration, but not of limitation, sixteen bands 13 encircling the limb B. Each band 13 is connected to an air distributing conduit 18 in the manner shown and described in connection with FIGURE 7 for one band 13. The conduits 18 are connected to the ports 48 of distributor 17 in accordance with a predetermined pattern so that the distributor 17 will inflate and vent the bands 13 progressively in a proximal direction along the limb B. This pattern is based on the fact that the chamber 57 is shaped to communicate with no more than six air outlet ports 48 at any given time while the chamber 58, on the other hand, is shaped to communicate with ten ports 48.

Figure 14:
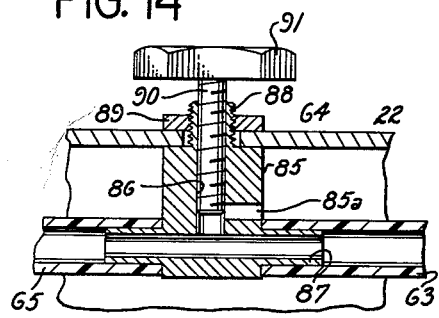
FIGURE 14 is a cross-sectional view, on an enlarged scale, taken along line 14—14 of FIGURE 4.
Figure 15:
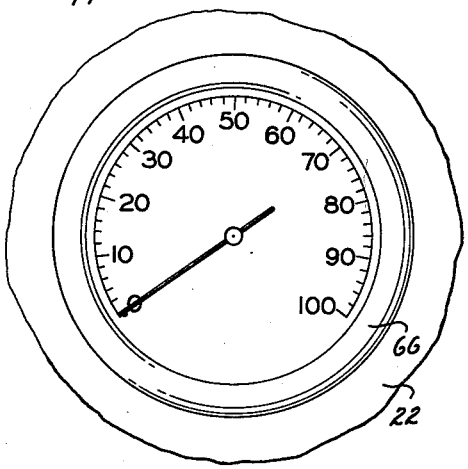
FIGURE 15 is a plan view of a pressure gage employed on the device of FIGURE 1.

Referring now to FIGURES 4, 14 and 15, the pressure regulator 64 and the pressure gauge 66 are attached to the cover 22. The regulator 64 is designed to maintain about 40 mm. Hg pressure in each band 13 when it is inflated and includes a body portion 85 having an interiorly threaded, vertical bore 86 communicating with a horizontal conduit 87 which has one end connected to the first conduit 63 and its other end connected to the second conduit 65. The body portion 85 is vented through an aperture 85a and also includes an upstanding, exteriorly threaded collar 88 which extends through a suitable aperture in cover 22 so that the body portion 85 may be affixed thereto by means of a nut 89. An exteriorly threaded shaft 90 has a knob 91 affixed to one end and threadedly engages the bore 86 in such a manner that the other end of the shaft 90 depends into the conduit 87. Air passing through the conduit 87 is regulated by exposing a greater or a lesser amount of the shaft 90 to the aperture 85a so that a lesser or greater amount of air is bled to atmosphere.

Figure 18:
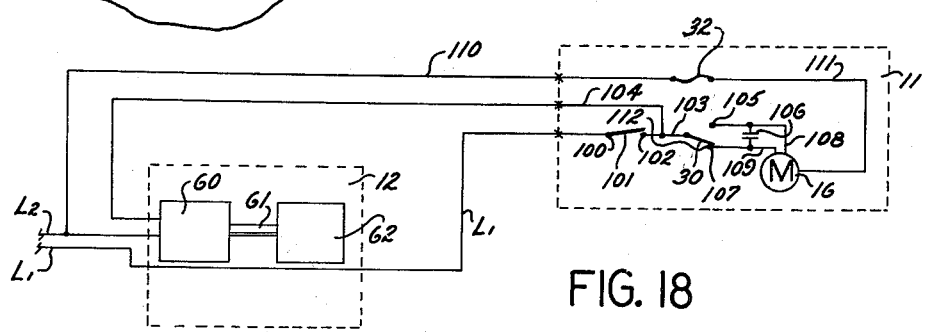
FIGURE 18 is a schematic wiring diagram for use in the device of the invention.

Referring now to FIGURE 18, the motors 16 and 60 are connected in an electrical circuit having leads $L_1$ and $L_2$ of plug 61a connected to a source of power. The lead $L_1$ is connected to one contact 100 of a switch 101 in the timer 31. The other contact 102 of timer switch 101 is connected to the toggle switch 30 through a conduit 103 and to the motor 60 through a conduit 104. The toggle switch 30 is a double throw switch having a contact 105 connected to one side of a motor-starting capacitor 106 and another contact 107 connected to the other side of the capacitor 106. The capacitor is connected to the motor 16 through conduits 108 and 109, respectively. The motors 60 and 16 are protected by the fuse 32 which is connected to motor 60 through conduits 110 and lead $L_2$ and to motor 16 through a conduit 111. The motor 16 runs in one direction when the switch 30 is in contact with the contact 107 and runs in the opposite direction when the switch 30 is in contact with the contact 105.

Referring now to FIGURES 1 and 5, the conduits 18 are arranged in such a manner that, when inflatable bands 13 are placed in fluid communication therewith and the rotor 46 is rotated in a first direction, the bands 13a–13h and the bands 13i–13p will inflate and deflate in accordance with a predetermined sequence designed to move tissue, fluid and blood of the patient in a proximal direction when the right limb B of the patient is placed in the machine, as shown in FIGURE 1. Should the other limb B be placed in the machine so that the proximal portion of the limb B is at the end of the machine now occupied by the lower extremity thereof, the switch 30 may be moved to its other position reversing the electric motor 16 thereby rotating the rotor 46 in a second direction so that bands 13p and 13h will inflate first and inflation of the remaining bands will proceed in the reverse order to what they did when the rotor was rotated in the said first direction so that the sequence of operation will still move tissue, fluid and blood in a proximal direction. Both the lower and upper portions of the limb B are worked on simultaneously and the bands 13 apply a mild pressure of about 40 mm. Hg.

Operation of the device will be readily understood. Assuming that the right limb B is in the machine as shown in FIGURE 1, that the bands 13 are applied thereto as also shown, and that the toggle switch 30 is set in a first direction so that it closes a circuit between conduits 103 and contact 107 and that the timer 31 has been set to run the machine for a predetermined time thereby closing the switch 101 against its contact 102. Then when the electrical plug 61a is connected through leads $L_1$ and $L_2$ to a source of power activating motor 60 and driving air compressor 62 through shaft 61, compressed air will be directed through the conduit 63, pressure regulator 64, pressure gauge 66 and conduit 67 into the distributor 17. When the electrical plug 61a is connected to a source of power, current flows to the motor 16 through lead L₁, contact 100, switch 101, contact 102, conduit 103, switch 30, contact 107, and conduit 109 to one side of motor 16 and through lead L₂, conduit 110, fuse 32, and conduit 111 to the other side of motor 16. Operation of the motor 16 causes its shaft 36 to rotate at 14 r.p.m. thereby rotating the fingers 39 on hub 38 to drive the rotor 46 at the same speed. The rotor 46 will distribute air through the outlet ports 48 in body 45 in such a manner that bands 13 will inflate and deflate as follows:

Bands 13a and 13i will inflate simultaneously and hold; 13b and 13j will inflate next and hold; then 13c and 13k will inflate and hold. Next, 13d and 13l begin to inflate and 13a and 13i simultaneously begin to deflate; bands 13e and 13m inflate while 13b and 13j deflate; 13f and 13n inflate while 13c and 13k deflate; 13g and 13o inflate while 13d and 13l deflate; and 13h and 13p inflate while 13e and 13m deflate. Then bands 13a and 13i inflate again while 13f and 13n deflate; 13b and 13j inflate while 13g and 13o deflate; and 13c and 13k inflate while 13h and 13p deflate, thus completing one complete cycle of operation. With the rotor 46 turning at 14 r.p.m., this sequence of operation proceeds uniformly in a proximal direction along the limb B applying increments of pressure thereto in much the same manner as a cow's teat is squeezed when she is milked by hand. This pattern of applying and releasing pressure will proceed cyclically for the predetermined time set in the timer 31. At the expiration of this time, the switch 101 opens thereby interrupting the circuit to both the motors 60 and 16 discontinuing operation of the machine 10.

One example of the method of the invention is as follows:

A female patient had Raynaud's disease. Before treatment in accordance with the method of the invention, she had already had episodes of gangrene of the fingers resulting in the partial removal of two. The toes were showing marked circulatory and sensory changes with edema and swelling, as also were the other fingers with crusted degenerative areas at the tips. The blood pressure was quite erratic, and measured differently in arms and legs.

The hereinafter described treatments were started at first for one half hour twice daily for the first sixty days on each extremity and then one half hour once daily for one hundred twenty days on each extremity, along with medication for controlling and stabilizing blood pressure, resulting in disappearance of the degenerative areas at the tips of the fingers and reduction of swelling and edema. With the continuance of treatment for six months, the peripheral circulation had stabilized and no further removal of appendages was necessary. Her blood pressure stabilized in the normal range and the peripheral circulation remained adequate.

Each treatment comprised the steps of applying a mild pressure of about 40 mm. Hg to the periphery of a two inch strip of the limb at its tip and mid-portion simultaneously and progressively applying a mild pressure of about 40 mm. Hg sequentially in a proximal direction to adjacent two inch strips of the limb while releasing the pressure from the third preceding distal strip.

While the particular device and method herein shown and described for stimulating peripheral vascular circulation are fully capable of attaining the objects and providing the advantages hereinbefore stated, it is to be understood that they are merely illustrative of the presently preferred embodiments of the device and method of the invention and that no limitations are intended to the details of construction or design or the operational steps herein shown and described other than as defined in the appended claims.

I claim:

1. A device for stimulating peripheral vascular circulation in a proximal direction comprising:
    an air distributing mechanism including a shaped cavity for receiving the limb of the patient to be treated;
    a plurality of slotted openings arranged longitudinally along said cavity;
    an air outlet conduit mounted subjacent each slotted opening;
    an air distributor connected to said conduits for supplying air thereto, said air distributor including a rotor having a first air chamber in fluid communication with a portion of said conduits and a second air chamber in fluid communication with the remainder of said conduits;
    motor means for rotating said rotor;
    an air compressor for supplying air to said distributor; and
    an inflatable band in fluid communication with each of said conduits.

2. The device of claim 1 wherein said conduits are connected to said distributor in such a manner that the bands at one end and the mid-portion of said cavity inflate simultaneously and the adjacent bands from said one end to said mid-portion inflate sequentially thereafter while the third preceding band deflates and the bands from said mid-portion to the other end of said cavity progressively inflate while each third preceding band deflates.

References Cited in the file of this patent

UNITED STATES PATENTS

| | | |
|---|---|---|
| 1,608,239 | Rosett | Nov. 23, 1926 |
| 2,533,504 | Poor | Dec. 12, 1950 |
| 2,841,149 | Marsden | July 1, 1958 |